United States Patent
Grassl et al.

(10) Patent No.: US 8,361,302 B2
(45) Date of Patent: Jan. 29, 2013

(54) METHOD FOR INITIATING RADICAL POLYMERIZATIONS

(75) Inventors: Harald Grassl, Feichten an der Alz (DE); Jochen Mezger, Garching an der Alz (DE); Alexander Kraus, Evenhausen (DE); Gerhard Albrecht, Prien am Chiemsee (DE)

(73) Assignee: Construction Research & Technology GmbH, Trostberg (DE)

( * ) Notice: Subject to any disclaimer, the term of this patent is extended or adjusted under 35 U.S.C. 154(b) by 214 days.

(21) Appl. No.: 12/934,528

(22) PCT Filed: Mar. 12, 2009

(86) PCT No.: PCT/EP2009/052889
§ 371 (c)(1),
(2), (4) Date: Oct. 15, 2010

(87) PCT Pub. No.: WO2009/132884
PCT Pub. Date: Nov. 5, 2009

(65) Prior Publication Data
US 2011/0034625 A1    Feb. 10, 2011

(30) Foreign Application Priority Data
Apr. 28, 2008  (EP) .................................... 08103743

(51) Int. Cl.
*C25B 3/00*    (2006.01)

(52) U.S. Cl. ............................ 205/414; 524/804; 526/72
(58) Field of Classification Search ....................... None
See application file for complete search history.

(56) References Cited

U.S. PATENT DOCUMENTS

| | | | |
|---|---|---|---|
| 3,464,960 A | 9/1969 | Sobieski et al. | |
| 3,573,180 A | 3/1971 | Hodes et al. | |
| 4,411,745 A | 10/1983 | Ball et al. | |
| 5,549,807 A | 8/1996 | Bell et al. | |

FOREIGN PATENT DOCUMENTS

DE    43 08 716 A1    9/1994

OTHER PUBLICATIONS

Prashantha et al. J. Appl. Polym. Sci. 84 (2002) 983-992.*
Sine, G., et al., "Nafion®-assisted deposition of microemulsion-synthesisez platinum nanoparticles on BDD Activation by electrogenerated 'OH radicals", Electrochimica Acta, 2005, vol. 50, pp. 2249-2252.
Marselli, B., et al., "Electrogeneration of Hydroxyl Radicals on Boron-Doped Diamond Electrodes". Journal of Electrochemical Society, Feb. 5, 2003, vol. 150, Issue 3, pp. D79-D83.
PCT/EP2009/052889—Written Opinion of the International Searching Authority. Jun. 8, 2009.
PCT/EP2009/052889—International Search Report, Jun. 8, 2009.

* cited by examiner

*Primary Examiner* — Vu A Nguyen
(74) *Attorney, Agent, or Firm* — Curatolo Sidoti Co., LPA; Joseph G. Curatolo; Salvatore A. Sidoti

(57) ABSTRACT

The invention relates to a process for the preparation of polymers by free radical polymerization of monomers in the presence of water, electrochemically produced free radicals being used for initiating the free radical polymerization.

16 Claims, No Drawings

US 8,361,302 B2

METHOD FOR INITIATING RADICAL POLYMERIZATIONS

CROSS REFERENCE TO RELATED APPLICATIONS

This application is a national stage application of International Application No. PCT/EP2009/052889, filed 12 Mar. 2009, which claims priority from European Patent Application Serial No. 08 103 743.4, filed 28 Apr. 2008, from which applications priority is claimed, and which are incorporated herein by reference.

The invention relates to a process for the preparation of polymers, the polymer and the use of the polymer.

The industrially most important polymerization techniques include free radical solution, emulsion and suspension polymerization. In these polymerization types, free radical polymerization initiators, such as peroxides or azo compounds or photoinitiators, are usually used. The use of such polymerization initiators gives rise as a rule to the following disadvantages:

More difficult control of the free radical concentration: the initiators must be metered in over a relatively long time to enable the desired free radical concentration to be maintained. In particular, a rapid decrease in the free radical concentration may be problematic if the formation of free radicals takes place through slow decomposition of initiator already metered in.

Control of the initiator decomposition: the decomposition of the polymerization initiator and hence the level of the free radical concentration are dependent on a plurality of factors—in particular on temperature, solvent, pH, concentration and any coinitiator present. From this it follows that the free radical concentration can be regulated only with difficulty. This can result in undesirably broad molecular weight distributions of the polymers obtained and safety problems with regard to the underlying process technology.

Thermal initiator decomposition: the required temperatures may exceed the boiling points of the monomers in many cases and thus necessitate a polymerization under pressure. Thermally labile substances cannot be polymerized in such systems.

Photolytic initiator decomposition: the decomposition of the initiator by means of UV light permits a polymerization at low temperatures but can scarcely be used on an industrial scale in batch processes since the light intensities decrease considerably with an increasing distance from the light source.

Costs: the free radical polymerization initiators used in industry are usually relatively uneconomical.

Toxicity: some initiators and the decomposition products thereof constitute a health hazard.

pH dependence: with the use of some initiator systems (in particular in the case of redox systems), a certain pH range is essential for ensuring a sufficient rate of initiation.

Safety aspects: the storage and the transport of many initiators (in particular of peroxides and azo compounds) constitute a real problem in practice.

Conventionally operated polymerization reactors may go out of control with evolution of a large amount of heat, inter alia also because the decomposition rate of polymerization initiators increases as a rule with increasing reactor temperatures. Such an uncontrollable state can frequently be counteracted only by addition of inhibitors.

Undesired secondary reactions: if, for example, peroxides are used as initiators, the reaction mixture also contains a strong oxidizing agent. The result of this may be that oxidation-sensitive components of the reaction mixture react in an undesired manner with the peroxide in a secondary reaction.

It is therefore an object of the present invention to provide a free radical polymerization process in which the abovementioned disadvantages in association with initiation can be avoided.

This object is achieved by a process for the preparation of polymers by free radical polymerization of monomers in the presence of water, electrochemically produced free radicals being used for initiating the free radical polymerization.

Electrochemically produced free radicals in the context of the present invention are free radicals which form on the basis of electrolysis at electrode surfaces and directly or indirectly (e.g. through free radical transfer) initiate free radical polymerization.

The electrochemically initiated free radical polymerization can be easily controlled from the point of view of process engineering: the free radical concentration can be easily and exactly controlled via the current strength. As a result, more uniform polymers can ultimately be obtained. This is because, inter alia, the monomer concentration can be adjusted ideally—according to reactivity of the respective monomer type—on the basis of the exactly adjustable free radical concentration. Owing to the readily controllable free radical concentration, polymerization can be effected relatively easily and virtually isothermally, with the result that once again conditions for the preparation of uniform polymers can be created. If the reaction mixture should overheat during polymerization, the heat-generating polymerization can be immediately stopped by reducing the current strength or switching off the current source. This is to be regarded as an important safety aspect particularly in industrial practice.

By means of the electrochemically initiated free radical polymerization, high conversions can be achieved. Furthermore, decomposition products of initiators can be avoided so that the polymer obtained can be obtained without degradation products of initiator, which products may be hazardous to health.

In a particularly preferred embodiment of the invention, the free radical polymerization takes place in the electrolysis liquid of an electrolysis apparatus having a cathode and anode, the electrolysis liquid comprising the monomers and the water, and the electrolysis voltage being 2.0 to 100 V, preferably 2.8 to 50 V, particularly preferably 3.0 to 15 V.

The electrochemically produced free radicals form at the anode or at the interface between anode and electrolysis liquid. Very probably, it is as a rule to be assumed that the free radicals produced electrochemically at the anode by this process are present at least substantially as hydroxyl radicals. Clear indications of this mechanism are known from the following publications: B. Marselli, J. Garcia-Gomez, P-A. Michaud, M. A. Rodrigo, Ch. Comninellis, J. Electrochem. Soc. 150 (2003)$_{79}$; G. Sine, Ch. Comninellis, Electrochimica acta 50 (2005)2249-2254. The anodically produced free radicals can initiate a polymerization in the electrolysis liquid which contains monomers capable of free radical polymerization.

Overall, it may be said that an economical free radical source is used in this process. Furthermore, the process may be regarded as energy-saving since it is entirely possible to work at room temperature. Undesired secondary reactions with initiators can be avoided since the use of additional free radical polymerization initiators not produced electrochemically is not required.

In a further preferred embodiment of the invention, the anode is present in the form of a diamond electrode which has an electrically conductive (preferably metallic) base body to which a diamond layer is applied, which diamond layer is doped with chemical elements which are not included among the 4th main group of the Periodic Table of the Elements. As a rule, the diamond layer is doped with elements of the 3rd main group, preferably with boron, or with elements of the 5th main group, preferably with nitrogen and/or phosphorus. In general, the diamond layer is doped with boron and the boron content in the diamond layer is 10 to 10 000 ppm, preferably 10 to 4000 ppm, particularly preferably 100 to 3000 ppm. Owing to the chemically inert surface of the diamond electrode, electron transfers to organic compounds are more greatly limited than in the case of conventional electrodes. The oxidizing or reducing effect on the monomers used is much smaller. The surface of the diamond electrode used in the process according to the invention is not fogged or coated by the resulting polymer if the polymer is soluble in the electrolyte. The diamond surface proves to be stable and abrasion-resistant even at high flow rates of the electrolysis liquid, both in the acidic and in the alkaline pH range. Boron-doped diamond electrodes are commercially available, in particular also in sizes which are suitable for the industrial scale. It should be mentioned that such diamond electrodes are used commercially in wastewater treatment.

Not only the anode but also the cathode is preferably in the form of a diamond electrode. However, the cathode may also consist of the customary electrode materials used, such as platinum, copper, silver, iron, aluminium, titanium, mercury, lead, cadmium, tin, lead amalgams and cadmium amalgams, graphite or glass-carbon, in adaptation to the chemical environment.

As a rule, the electrolysis liquid contains 15 to 99% by weight, preferably 25 to 80% by weight, particularly preferably 40% to 70% by weight, of water and 1 to 85% by weight, preferably 20 to 75% by weight, particularly preferably 30 to 60% by weight, of monomer.

Frequently, the electrolysis liquid contains an auxiliary electrolyte in which the conductivity of the electrolysis liquid is increased. The content of the auxiliary electrolyte in the electrolysis liquid is often about 0.1 to 10% by weight. For example, the following are suitable as auxiliary electrolytes: protic acids, such as organic acids, in particular methanesulphonic acid, benzenesulphonic acid or toluenesulphonic acid, mineral acids, such as sulphuric acid or phosphoric acid, and neutral salts. The latter may contain, for example, the following cations: metal cations, such as lithium, sodium or potassium, subgroup metal cations, such as iron, copper or zinc, quaternized nitrogen compounds, such as ammonium or tetraalkylammonium cations (such as, for example, tetramethylammonium). The following are suitable as anions: fluoride, tetrafluoroborate, sulphonates, such as methanesulphonate, benzenesulphonate or toluenesulphonate, sulphate, methylsulphate, sulphites, phosphates, such as methylphosphate, ethylphosphate, dimethylphosphate, phosphonates, such as methyl methylphosphonate, phosphites, nitrates, nitrites, halides, halohalides and hydroxides. Furthermore, basic compounds, such as alkali metal or alkaline earth metal hydroxides, alkali metal or alkaline earth metal carbonates, alkali metal or alkaline earth metal bicarbonates, are suitable. If the water is provided in the form of drinking water or demineralized water, an auxiliary electrolyte should expediently be used in addition to the monomers. This is not true if monomers used (e.g. acrylic acid) themselves contribute considerably to the conductivity. The conductivity of the electrolysis liquid should as far as possible be at least about 100 µS/cm, preferably at least 500 µS/cm.

The electrolysis liquid may also contain sparingly water-soluble or water-insoluble monomers and a solubilizer. Suitable solubilizers are frequently (particularly when corresponding redox byproducts are undesired) preferably components which do not have a high redox sensitivity. Ethers, in particular tetrahydrofuran, are preferably used as solubilizers. Further solubilizers possible in practice would be: ether compounds, such as dioxane, polyethers, polyethylene glycols, primary, secondary and tertiary alcohols (such as methanol, ethanol, n-propanol, isopropanol, tert-butyl alcohol, 2-butanol, ethanediol, propane-1,2-diol or propane-1,3-diol), ketones (such as acetone or methyl ethyl ketone), acetonitrile, dimethylformamide, dimethyl sulphoxide (DMSO) or ionic liquids generally consisting, for example, of dialkylimidazolium, N,N',N'''-hexaalkylguanidinium, alkylpyridinium, tetralkylammonium and/or tetraalkylphosphonium cations and chloride, bromide, iodide, tetrafluoroborate, tetrachloroaluminate, tetrachloroferrate(III), hexafluorophosphate, trifluoromethanesulphonate, alkylsulphonate or benzenesulphonate as anions.

The free radical polymerization is generally carried out as a solution polymerization, as an emulsion polymerization or as an inverse suspension polymerization.

It is possible to use free radical acceptors to which the electrochemically produced free radicals can transfer their free radical function.

The free radical acceptors are frequently compounds known as so-called chain regulators (compounds to which the free radical function can be transferred), such as mercaptans. The following may be mentioned in particular as free radical acceptors: mercaptoalkanols (such as mercaptoethanol), mercaptocarboxylic acids (such as 3-mercaptopropionic acid), tetrahydrofuran, tert-butanol, isopropanol, water-soluble tert-alkyl compounds, ascorbic acid, peroxides, such as peroxodisulphates, or hydroperoxides, such as tert-butyl hydroperoxide, amines, phosphites, aromatics having benzylic hydrogens, such as, for example, toluene, halogen-containing hydrocarbons, such as methylene chloride, chloroform. The use of free radical acceptors or free radical transfer agents makes it possible to remove the initiating free radical function further from the anode surface and hence to increase the effective reaction space.

If substances which are known from controlled radical polymerization (CRP) are used as free radical transfer agents, the polymerization can become a living free radical polymerization as a result of electrochemical initiation. This method permits the preparation of polymers having a block structure, star polymers, graft copolymers, telechelic polymers and generally polymers having a particularly low polydispersity. The agents known from (reversed) atomic transfer radical polymerization (ATRP), reversible chain-transfer polymerization (RAFT), nitroxide mediated polymerization (NMP), and diphenylethylene polymerization (DPE) are possible agents. For (reversed) ATRP, halides or oxides of transition metals, which are complexed by (generally polydentate) ligands and are (at least partly) brought into solution, are used as catalysts. The most common are:

Cu I salts and Cu II salts, in particular oxide, chloride or bromide,

Fe II salts and Fe III salts, such as Fe II chloride or sulphate,

Ni II salts and Ni III salts, such as chloride or bromide.

Generally used ligands are 2,2''-bipyridine (optionally also substituted), e.g. 4,4'-dialkyl-2,2'-bipyridine, pentamethyldiethylenetriamine (PMDETA), tris(2-dimethylaminoethyl) amine, triphenylphosphine or Schiff bases obtained from 2-pyridinaldehyde and primary amines. These are dithioesters, trithiocarbonates and xanthogenates in the case of RAFT, N-oxides, such as, for example, 2,2,6,6-tetramethylpiperidine (TEMPO) in the case of NMP polymerization and 1,1-diarylethenes, such as 1,1-diphenylethylene, in the case of DPE polymerization.

Usually, the electrolysis liquid has a pH of 0 to 14, preferably 1 to 12. This pH is determined by means of a standard glass electrode.

Frequently, the electrolysis voltage is adjusted so that the current density is 0.05 to 100 mA/cm$^2$, preferably 0.1 to 80 mA/cm$^2$ and particularly preferably 1 to 40 mA/cm$^2$.

The electrolysis voltage used is a DC voltage or AC voltage, the polarity reversal frequency preferably being 50 Hz to 1 mHz in the case of an AC voltage.

The monomers are present as neutral monomers, as cationic monomers and/or as anionic monomers. In principle, all monomers capable of free radical polymerization can be used. For example, the following may be used:

- arylalkenes and heteroarylalkenes, optionally substituted, such as, for example: styrene, alpha-methyl styrene, vinylpyridine, 4-vinylphenylsuiphonic acid, 4-vinylbenzoic acid, 4-vinylphthalic acid and salts thereof
- allyl and methallyl compounds, such as, for example: allyl alcohol, allyl(polyalkoxy)ether, allylsulphonic acid, methallyl alcohol, methallyl(polyalkoxy)ether, methallylsulphonic acid, 3-allyloxy-1,2-propanediol, 3-allyloxy-1,2-propanediol, 3-allyloxy-1,2-propanediol (polyalkoxyl)ether, 3-methallyloxy-1,2-propanediol, 3-methallyloxy-1,2-propanediol(polyalkoxyl)ether, isoprenol, isoprenol alkyl ether, isoprenoyl(polyalkoxy) ether
- vinyl ethers, such as, for example, 1-butyl vinyl ether, isobutyl vinyl ether, aminopropy vinyl ether, ethylene glycol monovinyl ether, 4-hydroxybutyl monovinyl ether, vinyl ether alkoxylates,
- vinyl esters, such as, for example, vinyl acetate, vinyl carbamate
- vinylic aldehydes and ketones, such as, for example, acrolein, methacrolein, vinyl-1,3-dioxolane, crotonaldehyde, 3-oxo-1-butene
- acrylic and methacrylic compounds
    - acrylic acid and methacrylic acid, salts thereof and esters thereof, such as, for example, 2-hydroxyethyl acrylate, 2-hydroxethyl methacrylate, hydroxypropyl acrylate, hydroxypropyl methacrylate, methyl methacrylate, ethyl methacrylate, methyl acrylate, (methyl)polyoxyalkyl acrylates, (methyl)polyoxyalkyl methacrylates, 2,3-hydroxypropyl (meth)acrylate,
    - acrylamides and methacrylamides, optionally substituted, such as acrylamide, methacrylamide, N,N-dimethylacrylamide, N-isopropylacrylamide, N-methacryloylglycinamide, acrylamidomethylpropylsulphonic acid (AMPS), acryloyloxyethyltrimethylammonium chloride
    - acrylonitrile and methacrylonitrile
- unsaturated polycarboxylic acids and derivatives thereof, such as, for example: maleic acid, maleic anhydride, maleic acid mono- and diesters, such as, for example: dimethyl maleate, monomethyl maleate, diethyl maleate, ethyl maleate, dibutyl maleate, poly(oxyalkylene monomethyl ether) monomaleate, poly(oxyalkylene monomethyl ether) dimaleate, maleamides, such as, for example, maleic acid sulphanilamide, poly(oxyalkylene monomethyl ether)maleamide, poly(oxyalkylene) maleamide, maleic acid monoanilide, maleimides, such as, for example, maleimide, N-ethylmaleimide, itaconic acid and itaconic anhydride, itaconic acid mono(di)esters, such as, for example: dimethyl itaconate, monomethyl itaconate, diethyl itaconate, monoethyl itaconate, mono-poly(oxyalkylene monomethyl ether) itaconate, di-poly(oxyalkylene monomethyl ether) itaconate, itaconamide, such as, for example: monomethylpolyoxyalkyleneitaconamide, 2,4-hexadienoic acid,
- vinylic sulphur and phosphorus compounds
    - alkyl vinyl sulphones
    - vinyl sulphones
    - alkenesulphonic acids, such as, for example, 2-acrylolamido-2-methylpropanesulphonic acid, vinylbenzenesulphonic acid, vinylsulphonic acid, 3-suiphopropyl acrylate,
    - methallyl sulphonate, methacrylic acid ethyl sulphate, [2-(acryloyloxy)ethyl]trimethylammonium methylsulphate,
    - vinylphosphonic acid
- N-vinylamides, such as, for example: 1-vinyl-2-pyrrolidone, 1-vinyl-2-piperidine, 1-vinyl-2-caprolactam, 5-vinylcarbazole, 2-vinylpyridine, 4-vinylpyridine, 2-methyl-5-vinylpyridine, N-vinylacetamide, N-vinylformamide
- phosphorus-containing vinyl compounds, such as phosphonic acids and phosphates, such as, for example: 2-hydroxyethyl acrylate phosphate, 2-hydroxyethyl methacrylate phosphate, phosphocolmaleamide, phosphocolacrylamide, phosphocolmethacrylamide,
- alkenes and derivatives thereof: 2-butene-1,4-diol (and polyoxyalkylates thereof), 3,4-dihydroxy-1-butene (and polyoxyalkylates thereof), dimethylvinylcarbinol (and polyoxyalkylates thereof), prenol (and polyoxyalkylates thereof), 3-methyl-3-buten-2-ol (and polyoxyalkylates thereof).

In the case of all monomers having anionic groups (carboxylic acids, phosphonic acids, sulphonic acids, phosphates), salts thereof from the group consisting of the alkali metals, alkaline earth metals and ammonium compounds are also suitable.

Regarding the design of the electrolysis apparatus which is frequently used, the following may be stated: preferably, the electrodes are arranged plane parallel because in this embodiment a homogeneous current distribution is present in the case of a small electrode gap. In general, the electrode surface or the space between the electrodes should be such that as intensive mass transfer as possible between the solution and the surface diffusion layer takes place. For this purpose, baffles comprising a non-conductive material which promote turbulent flow behaviour can be mounted in the space between the electrodes. These baffles may have, for example, the shape of rhombuses, ribs or channels. A plane parallel arrangement of electrode grids, expanded metal electrodes, electrode nets, over which the reaction mixture is passed is also possible. The finished electrode surfaces may have a fine structure comprising ribs, channels, rhombuses, etc. In this case, the electrodes are preferably used individually or a plurality of electrodes are stacked. The latter case involves the use of stacked electrodes which can be connected serially in a bipolar manner in the so-called plate stack cell. Divided cells having a plane parallel electrode arrangement or cartridge-like electrodes are preferably used when the catholyte must be separated from the anolyte (this is then the electrolysis liquid) in order, for example, to rule out secondary chemical reactions or to simplify the subsequent separation of substances. Ion exchange membranes, microporous membranes, diaphragms, filter fabrics comprising non-electron-conducting materials, glass frits and porous ceramics may be used as the separation medium. The electrodes are preferably also arranged plane parallel in the case of divided cells since, in this embodiment, a homogeneous current distribution is present in the case of small electrode gaps. These two cell types which have been explained can be adapted in their dimensioning according to their size from laboratory through product plant size to production. The reaction mixture flows through the undivided electrolysis cell, the flow rate frequently being 0.1 m/s-3 m/s. In the case of the divided electrolysis cell, the flow rate of the anolyte is frequently 0.1 m/s-3 m/s. The process can also be operated under pressure.

As a rule, the spacing between the cathode and the anode is 0.2 to 30 mm, preferably 1 to 10 mm.

In an embodiment of the invention, the free radical polymerization is carried out in a continuous mode of operation. A plurality of the electrolysis apparatuses described above can be connected in series so that the electrolysis liquid is passed from one electrolysis apparatus into the next. The reaction mixture can be circulated. In principle, virtually all known continuous process apparatuses can be equipped with corresponding electrolysis cells or may even be part of electrolysis cells (in this context, for example, tubular and tube-bundle reactors, loop reactors and spinning-disc reactors may be mentioned). In the case of batch operation, one or more circulations in which the abovementioned reaction cell types are incorporated can be set up at a stirred container.

In a further embodiment of the present invention, the free radical polymerization is carried out in a batchwise or semicontinuous mode of operation in the electrolysis apparatus. In this case, the anode and/or the cathode can be configured as stirring element segments of a stirred apparatus, with which the electrolysis apparatus is equipped. Furthermore, the electrolysis apparatuses can be integrated into one or more bypass pipes which are connected to the stirred tank and through which the reaction mixture is pumped.

The invention also relates to polymers which can be prepared according to the process described above.

These polymers may be present as copolymers which contain acid monomer structural units and polyether macromonomer structural units. Acid monomers are to be understood as meaning monomers which are capable of free radical copolymerization, have at least one carbon double bond, contain at least one acid function and react as an acid in the aqueous medium. Furthermore, acid monomers are also to be understood as meaning monomers which are capable of free radical copolymerization, have at least one carbon double bond and, owing to hydrolysis reaction in the aqueous medium, form at least one acid function and react as an acid in the aqueous medium (example: maleic anhydride). Polyether macromonomers in the context of the present invention are compounds which are capable of free radical copolymerization, have at least one carbon double bond and have at least two ether oxygen atoms, with the proviso that the polyether macromonomer structural units present in the copolymer have side chains which contain at least two ether oxygen atoms.

In a typical embodiment, the acid monomer structural unit is according to one of the general formulae (Ia), (Ib), (Ic) and/or (Id)

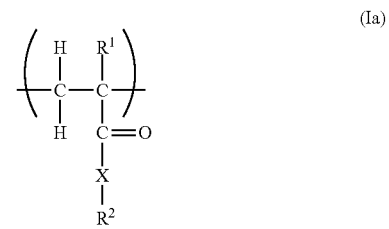

where
$R^1$ are identical or different (i.e. either identically or differently substituted within the copolymer) and are represented by H and/or a straight-chain or branched $C_1$-$C_4$ alkyl group (preferably H or $CH_3$);
X are identical or different and are represented by NH—$(C_nH_{2n})$ where n=1, 2, 3 or 4 and/or O—$(C_nH_{2n})$ where n=1, 2, 3 or 4 (preferably NH—$C_4H_8$) and/or by a unit not present (i.e. —X is not present);
$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

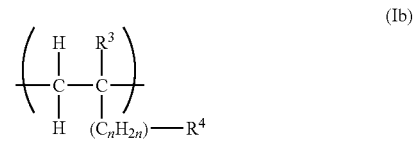

where
$R^3$ are identical or different and are represented by H and/or a straight-chain or branched $C_1$-$C_4$ alkyl group (preferably $CH_3$);
n=0, 1, 2, 3 or 4;
$R^4$ are identical or different and are represented by $SO_3H$, $PO_3H_2$, O—$PO_3H_2$ and/or $C_6H_4$—$SO_3H$ present in para-substituted form;

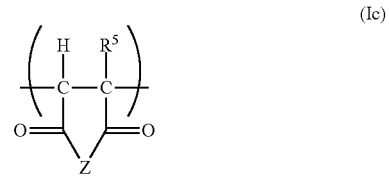

where
$R^5$ are identical or different and are represented by H and/or a straight-chain or branched $C_1$-$C_4$ alkyl group (preferably H);

Z are identical or different and are represented by O and/or NH;

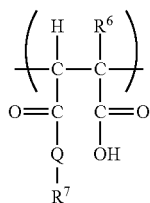 (Id)

where $R^6$ are identical or different and are represented by H and/or a straight-chain or branched $C_1$-$C_4$ alkyl group (preferably H);

Q are identical or different and are represented by NH and/or O;

$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, e=0, 1, 2, 3 or 4, $A'=C_{x'}H_{2x'}$ where x'=2, 3, 4 or 5 (preferably x'=2) and/or $CH_2C(C_6H_5)H$—, α=an integer from 1 to 350 (preferably α=15-200), where $R^9$ are identical or different and are represented by a straight-chain or branched $C_1$-$C_4$ alkyl group (preferably $CH_3$).

Regarding $R^2$, $R^4$ and $R^7$ in the structural formulae Ia, Ib and Id, it should be noted that the corresponding acid functions can be present in deprotonated form (in the polymer), in particular on addition of bases (salt formation).

The expression "identical or different" used above and below is intended in each case to denote constancy or variability within the copolymer produced by the process according to the invention.

In practice, methacrylic acid, acrylic acid, maleic acid, maleic anhydride, or a monoester of maleic acid or a mixture of a plurality of these components is often used as acid monomer.

In a typical embodiment, the polyether macromonomer structural unit is present according to one of the general formulae (IIa), (IIb) and/or (IIc)

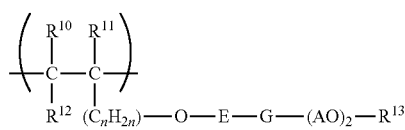 (IIa)

where $R^{10}$, $R^{11}$ and $R^{12}$ are in each case identical or different and, independently of one another, are represented by H and/or a straight-chain or branched $C_1$-$C_4$ alkyl group (preferably H and/or $CH_3$);

E are identical or different and are represented by a straight-chain or branched $C_1$-$C_6$ alkylene group ($C_1$, $C_2$, $C_3$, $C_4$, $C_5$ or $C_6$ are in each case typical but $C_2$ and $C_4$ are preferred), a cyclohexyl group, $CH_2$—$C_6H_{10}$, $C_6H_4$ present in ortho-, meta- or para-substituted form and/or a unit not present (i.e. -E is not present);

G are identical or different and are represented by O, NH and/or CO—NH, with the proviso that, if E is a unit not present, G is also present as a unit not present (i.e. -G is not present);

A are identical or different and are represented by $C_xH_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200);

$R^{13}$ are identical or different and are represented by H, a straight-chain or branched $C_1$-$C_4$ alkyl group, CO—$NH_2$ and/or $COCH_3$ (preferably H, $CH_3$);

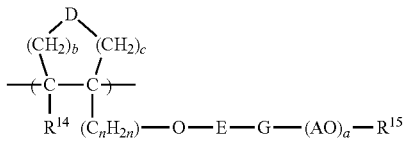 (IIb)

where $R^{14}$ are identical or different and are represented by H and/or a straight-chain or branched $C_1$-$C_4$ alkyl group (preferably H);

E are identical or different and are represented by a straight-chain or branched $C_1$-$C_6$ alkylene group (preferably $C_2H_4$), a cyclohexyl group, $CH_2$—$C_6H_{10}$, $C_6H_4$ present in ortho-, meta- or para-substituted form and/or by a unit not present (i.e. -E is not present);

G are identical or different and are represented by a unit not present, O, NH and/or CO—NH, with the proviso that, if E is a unit not present, G is also present as a unit not present (i.e. -G is not present);

A are identical or different and are represented by $C_xH_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200);

D are identical or different and are represented by a unit not present (i.e. -D is not present), NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

$R^{15}$ are identical or different and are represented by H, a straight-chain or branched $C_1$-$C_4$ alkyl group, CO—$NH_2$ and/or $COCH_3$ (preferably H);

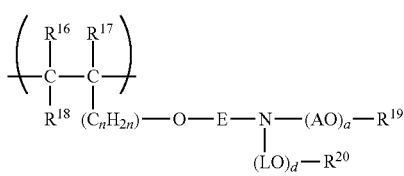 (IIc)

where $R^{16}$, $R^{17}$ and $R^{18}$ are in each case identical or different and, independently of one another, are represented by H and/or a straight-chain or branched $C_1$-$C_4$ alkyl group (preferably H and/or $CH_3$);

E are identical or different and are represented by a straight-chain or branched $C_1$-$C_6$ alkylene group (preferably $C_2H_4$ or $C_4H_8$), a cyclohexyl group, $CH_2$—$C_6H_{10}$, $C_6H_4$ present in ortho-, meta- or para-substituted form and/or by a unit not present (i.e. -E is not present);

A are identical or different and are represented by $C_xH_{2x}$, where x=2, 3, 4 and/or 5 (preferably x=2) and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 (preferably x=2) and/or $CH_2$—$CH(C_6H_5)$;

a are identical or different and are represented by an integer from 2 to 350 (preferably 10-200);

d are identical or different and are represented by an integer from 1 to 350 (preferably 10-200);

$R^{19}$ are identical or different and are represented by H and/or a straight-chain or branched $C_1$-$C_4$ alkyl group (preferably H), $R^{20}$ are identical or different and are represented by H and/or a straight-chain $C_1$-$C_4$ alkyl group (preferably H).

It may be stated in general that the polyalkoxy side chains $(AO)_a$ of the polyether macromonomers are generally pure polyethoxy side chains, but not infrequently mixed polyalkoxy side chains, in particular those which contain both propoxy and ethoxy groups, are also present.

In practice, alkoxylated isoprenol (alkoxylated 3-methyl-3-buten-1-ol) and/or alkoxylated hydroxybutyl vinyl ether and/or alkoxylated (meth)allyl alcohol (allyl alcohol preferred over methallyl alcohol) having normally in each case an arithmetic mean number of oxyalkylene groups of 4 to 400, frequently of 10 to 50, is frequently used as the polyether macromonomer. Alkoxylated hydroxybutyl vinyl ether is particularly preferred.

In addition to the acid monomer and the polyether macromonomer, further monomer types may also be used.

The polyether macromonomer structural units may furthermore be present in the form of alkoxylated prenol units, dimethylcarbinol structural units, alkoxylated, vinylated methylpolyethylene glycol structural units, alkoxylated acrylates or methacrylates, alkoxylated acrylamides or methacrylamides, poly(oxyalkylene monoalkyl ether) methacrylates or poly(oxyalkylene monoalkyl ether) acrylates. The molecular weights of the polymer according to the invention can be adjusted as desired by means of the current strength (free radical concentration) and/or by use of chain regulators. The molar masses may be adjusted as a rule to between 5000 g/mol and 300 000 g/mol.

The invention furthermore relates to the use of the polymer described above for hydraulic binders and/or for latent hydraulic binders. In particular, owing to the typical, particularly uniform structure of the polymers according to the invention, their dispersing effect in the abovementioned binders is as a rule particularly good.

The use of the polymer according to the invention is, however, not limited thereto since highly pure polymers can be prepared (without initiators or initiator decomposition products) by the process according to the invention, for example for the food industry and for the pharmaceutical industry.

The invention is to be described in more detail below with reference to working examples.

EXAMPLE 1

Polymerization of a Poly(Ethylene Glycol) Monomethyl Ether Methacrylate Using an Undivided Flow-Through Cell Anode: Boron-doped diamond electrode comprising 2000 ppm of boron Cathode: Boron-doped diamond electrode comprising 2000 ppm of boron Electrode spacing: 2 mm Voltage: 3 V DC Current strength: 0.1 A Electrolyte: aqueous $H_2SO_4$ Electrode area of the anode: 10 $cm^2$ 30.0 g of poly(ethylene glycol) monomethyl ether methacrylate ($M_n$=475 g/mol) are mixed into 120.00 g of $H_2O$ and 0.5 g of concentrated $H_2SO_4$ is added. This solution is flushed with nitrogen during the entire experiment. The polymerization is carried out at room temperature.

The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete.

After 3 h, a substantial increase in viscosity is detectable. The gel permeation chromatogram (GPC) shows a polymer having a weight average molecular weight of 260 000 g/mol and a complete conversion of the monomer.

EXAMPLE 2

Copolymerization of Poly(Ethylene Glycol) Monomethyl Ether Methacrylate with Methacrylic Acid and Chain Regulator Using an Undivided Flow-Through Cell and Aqueous Sulphuric Acid as Electrolyte The setup and the process are as in Example 1.

30.0 g of poly(ethylene glycol) monomethyl ether methacrylate ($M_n$=475 g/mol) are added to 120.00 g of $H_2O$ and 5.43 g of methacrylic acid and mixed, and 0.5 g of concentrated $H_2SO_4$ and 0.27 g of 3-mercaptopropionic acid are added. This solution is flushed with nitrogen during the entire experiment. The polymerization is carried out at room temperature. A current strength of 0.3 A at 3.5 V was established.

The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete.

After 6 h, a substantial increase in viscosity of the clear solution is detectable. The gel permeation chromatogram (GPC) shows a polymer having a weight average molecular weight of 50 000 g/mol and a complete conversion of the monomers used. The polymer solution was then neutralized to pH 6.5 using 12.0 g of 20% strength NaOH.

EXAMPLE 3

Copolymerization of Poly(Ethylene Glycol) Monomethyl Ether Methacrylate with Methacrylic Acid and Chain Regulator Using an Undivided Flow-Through Cell and Hydrochloric Acid as Electrolyte The setup and the process are as in Example 1).

30.0 g of poly(ethylene glycol) monomethyl ether methacrylate ($M_n$=475 g/mol) are added to 120.00 g of $H_2O$ and 5.43 g of methacrylic acid and mixed, and 1.47 g of 25% HCl and 0.54 g of 3-mercaptopropionic acid are added. This solution is flushed with nitrogen during the entire experiment. The polymerization is carried out at room temperature.

A current strength of 0.3 A at 4.3 V was established. The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete. After 7 h, an increase in viscosity of the clear solution is detectable. The gel permeation chromatogram (GPC) shows a polymer having a weight average molecular weight of 32 745 g/mol and a polymer content of 82%. The polymer solution was then neutralized to pH 6.5 with 12.5 g of 20% strength NaOH.

EXAMPLE 4

Polymerization of a Poly(Ethylene Glycol) Monomethyl Ether Methacrylate Using an Undivided Flow-Through Cell at pH 7

The setup and the process are as in Example 1.

30.0 g of poly(ethylene glycol) monomethyl ether methacrylate ($M_n$=475 g/mol) are mixed into 120.00 g of $H_2O$ and 0.89 g of $K_2SO_4$ is added. This solution is adjusted to pH 7 with 20% strength NaOH. This solution is flushed with nitrogen during the entire experiment. The polymerization is carried out at room temperature. A current strength of 0.1 A at 4.0 V was established. During the reaction, the pH is kept at 7 with 2.5% strength NaOH. The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete. After 7 h, a substantial increase in viscosity of the clear solution is detectable. The gel permeation chromatogram (GPC) shows a polymer having a weight average molecular weight of 141 000 g/mol and a polymer content of 87%.

EXAMPLE 5

Copolymerization of 3-methyl-3-buten-1-ol ethoxylate (=isoprenol-PEG500) with 2-hydroxyethyl acrylate in an undivided flow-through cell at pH 1

The setup and the process are as in Example 1).

30.0 g of 3-methyl-3-buten-1-ol ethoxylate (0.06 mol) ($M_w$=500 g/mol) are mixed into 120.00 g of $H_2O$ and 1.5 g of concentrated $H_2SO_4$ are added. 10.44 g of hydroxyethyl acrylate (0.09 mol) and 0.54 g of 3-mercaptopropionic acid are then added at room temperature.

This solution is flushed with nitrogen during the entire experiment. The polymerization is carried out at room temperature. A current strength of 0.3 A at 4.2 V was established.

The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete. After 4 h, a substantial increase in viscosity of the clear solution is detectable. The gel permeation chromatogram (GPC) shows a polymer having a weight average molecular weight of 21 070 g/mol and a polymer content of 56%.

EXAMPLE 6

Polymerization of 2-Hydroxyethyl Acrylate in a Tetrahydrofuran/Water Mixture Using an Undivided Flow-Through Cell The setup and the process are as in Example 1).

30.0 g of 2-hydroxyethyl acrylate are dissolved in 60.0 g of water and 60.0 g of tetrahydrofuran. 0.5 g of $K_2SO_4$, 0.5 g of 3-mercaptopropionic acid and 1.0 g of 98% $H_2SO_4$ are added as electrolyte and are dissolved. This solution is not flushed with nitrogen. A current strength of 0.3 A at 4.0 V was established.

The polymerization is carried out at room temperature.

The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 100 times before the reaction is complete.

After 6 h the gel permeation chromatogram (GPC) shows a polymer having a weight average molecular weight of 19 400 g/mol and a polymer content of 71%.

EXAMPLE 7

Polymerization of Acrylic Acid in a Tetrahydrofuran/Water Mixture Using an Undivided Flow-Through Cell at pH 1

Anode: Boron-doped diamond electrode comprising 2000 ppm of boron

Cathode: Boron-doped diamond electrode comprising 2000 ppm of boron

Electrode spacing: 2 mm

Voltage: 5.9 V DC

Current strength: 1.3 A

Electrolyte: aqueous $H_2SO_4$

Electrode area of the anode: 52 cm$^2$

The setup is similar to the preceding examples but a larger experimental setup was used. The procedure was the same as in previous examples.

54.0 g of acrylic acid are dissolved in 60.0 g of water and 27.0 g of tetrahydrofuran. 2.0 g of $H_2SO_4$, 1.04 g of 3-mercaptopropionic acid are added as electrolyte and are dissolved. This solution is not flushed with nitrogen. A current strength of 1.3 A at 5.9 V was established.

The polymerization is carried out at room temperature.

The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 90 times before the reaction is complete.

After 5 h, the gel permeation chromatogram (GPC) shows a polymer having a weight average molecular weight of 29 154 g/mol and a polymer content of 80%. The polydispersity of the polymer is 1.44.

EXAMPLE 8

Copolymerization of a Poly(Ethylene Glycol) Monomethyl Ether Methacrylate with Methacrylic Acid, Chain Regulator and Tetrahydrofuran as Solubilizer Using an Undivided Flow-Through Cell and Aqueous Sulphuric Acid as Electrolyte The setup and the process are as in Example 7.

30.0 g of poly(ethylene glycol) monomethyl ether methacrylate ($M_n$=500 g/mol) are added to 80.00 g of $H_2O$, 40.0 g of tetrahydrofuran and 10.32 g of methacrylic acid and mixed and 1.0 g of concentrated $H_2SO_4$ and 0.52 g of 3-mercaptopropionic acid are added. This solution is flushed with nitrogen during the entire experiment. The polymerization is carried out at room temperature. A current strength of 1.3 A at 5.2 V is established. The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 50 times before the reaction is complete. After 3 h a substantial increase in viscosity of the clear solution is detectable. The gel permeation chromatogram (GPC) shows a polymer having a weight average molecular weight of 43 800 g/mol and the complete conversion of the monomers used. The tetrahydrofuran was then removed by means of vacuum distillation. The polymer solution was then neutralized to pH 6.5 with 19.27 g of 20% strength NaOH.

EXAMPLE 9

Polymerization of Acrylic Acid in a Tetrahydrofuran/Water Mixture Using an Undivided Flow-Through Cell at pH 2

54.0 g of acrylic acid are dissolved in 60.0 g of water and 27.0 g of tetrahydrofuran. 2.0 g of $H_2SO_4$, 1.04 g of 3-mercaptopropionic acid are added as electrolyte and are dissolved. This solution was adjusted to pH 2 with 6.50 g of 20% strength NaOH. This solution is not flushed with nitrogen. A current strength of 1.3 A at 5.9 V was established. The polymerization is carried out at 40° C. The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 120 times before the reaction is complete. After 7 h, the gel permeation chromatogram (GPC) shows a polymer having a weight average molecular weight of 29 848 g/mol and a polymer content of 50%. The polydispersity of the polymer is 1.43.

EXAMPLE 10

Copolymerization of Poly(Ethylene Glycol) Monomethyl Ether Methacrylate with Methacrylic Acid and Chain Regulator Using an Undivided Flow-Through Cell and Aqueous Sulphuric Acid as Electrolyte The setup and the process are as in Example 7.

60.0 g of poly(ethylene glycol) monomethyl ether methacrylate ($M_n$=475 g/mol) are added to 72.00 g of $H_2O$ and 10.32 g of methacrylic acid and mixed and 2.0 g of concentrated $H_2SO_4$ and 1.04 g of 3-mercaptopropionic acid are added. This solution is flushed with nitrogen during the entire experiment. The polymerization is carried out at room temperature. A current strength of 1.3 A at 5.3 V was established. The solution is transported through a flow-through cell by means of a pump. In this flow-through cell, the two electrodes are fixed with a spacing of 2 mm. The solution flows through the 2 mm wide gap. The solution leaves the cell and is transported back into the storage container. The solution thus circulates and in this way passes the electrode surface about 50 times before the reaction is complete. After 5 h, a substantial increase in viscosity of the clear solution is detectable. The gel permeation chromatogram (GPC) shows a polymer having a weight average molecular weight of 54 121 g/mol and the complete conversion of the monomers used.

The testing of the dispersing effect of the polymers according to the invention was effected in a mortar mix according to (DIN EN 1015-3).

Mixing Sequence of Mortar Mix:

600 g of cement powder are homogenized in the dry state and introduced into a RILEM mixer. The amount of water corresponding to a w/c value is then added and mixing is effected for 30 s at 140 rpm (speed I). The addition of the sand mixture is then effected with the aid of a funnel while the mixer is running and mixing is effected for 30 s at 140 rpm (speed I). After mixing is paused for 1.5 min and the edges of the mixer are cleaned, a corresponding amount of plasticizer is added. Mixing is effected for a further 60 s at 285 rpm (speed II) and the flow (slump) is then determined by tapping 15 times on a slump table with a Hagerman cone.

Formulation of the Mortar Mix for the Mortar Test

| Composition | Mortar test s/c value[a] = 2.2 | Weight [g] |
| --- | --- | --- |
| Aggregate | Quartz sand 30% | 178.2 |
|  | Standard sand 0/0.25 70% | 415.8 |
| Cement | CEM I 42.5R[b] | 270.0 |
| Plasticizer[c] | (20% strength solution) | 2.7 |
| Water |  | (d) |

[a] s/c value = Sand/cement value = Σ sand [g] + cement [g]
[b] Origin of cement: Karlstadt (Germany)
[c] 0.2% by mass of solid, based on cement
[d] The required amount of water is dependent on the set w/c value[e] according to the plasticizer used.
[e] w/c value = water/cement value = Σ water [g] + cement [g]

Mortar Results:

| Polymer No. | Dos.[a] | w/c value[b] | Slump[c] [cm] | | | |
|---|---|---|---|---|---|---|
| | | | 0' | 30' | 60' | 90' |
| Zero mix | 0 | 0.56 | 24.7 | 23.8 | 23.3 | 23.1 |
| Glenium[R] 27 | 0.24 | 0.49 | 24.8 | 24.3 | 24.4 | 24.6 |
| Example 2 | 0.24 | 0.49 | 23.6 | 22.2 | 22.3 | 22.1 |
| Example 3 | 0.24 | 0.49 | 23.8 | 23 | 22.6 | 22.7 |
| Example 8 | 0.2 | 0.425 | 24.9 | 23.4 | 22.5 | 22.0 |

[a]Dos. = Dose [% by mass of polymer, based on cement]
[b]w/c value = water/cement value: expresses the required amount of water for producing a flowable mortar in the case of a constant amount of cement.
[c]Slump, determined after 0, 30, 60 and 90 min.

The prepared polymers show a substantial water reduction, based on the zero mix without admixture. The plasticizing effect is comparable with or substantially better than the commercially available plasticizer Glenium® 27.

The invention claimed is:

1. Process for the preparation of polymers by free radical polymerization of monomers in the presence of water, comprising using electrochemically produced free radicals for initiating the free radical polymerization, wherein the free radical polymerization takes place in the electrolysis liquid of an electrolysis apparatus having a cathode and an anode, the electrolysis liquid comprises the monomers and the water, and the electrolysis voltage is 2.0 to 100 V, and wherein the anode is present in the form of a diamond electrode which has an electrically conductive, optionally metallic, base body to which a diamond layer is applied, which diamond layer is doped with chemical elements which are not included among the 4th main group of the Periodic Table of the Elements.

2. Process according to claim 1, wherein the diamond layer is doped with elements of the 3rd main group, optionally with boron, or with elements of the 5th main group, optionally with nitrogen and/or phosphorus.

3. Process according to claim 2, wherein the diamond layer is doped with boron and the boron content in the diamond layer is 10 to 10 000 ppm.

4. Process according to claim 1, wherein the electrolysis liquid contains 15 to 99% by weight of water and 1 to 85% by weight of monomer.

5. Process according to claim 1, wherein the electrolysis liquid contains monomers present in nonpolar form and a solubilizer, so that the water and the monomers present in nonpolar form are present in one phase, optionally ether, further optionally tetrahydrofuran, being used as the solubilizer.

6. Process according to claim 1, wherein the free radical polymerization is carried out as a solution polymerization, as an emulsion polymerization or as an inverse suspension polymerization.

7. Process according to claim 1, wherein free radical acceptors to which the electrochemically produced free radicals can transfer their free radical function are used.

8. Process according toclaim 1, wherein the electrolysis liquid has a pH of 1 to 12.

9. Process according to claim 1, wherein the electrolysis voltage is adjusted so that the current density is 0.05 to 100 mA/cm$^2$.

10. Process according to claim 9, wherein the electrolysis voltage used is a DC or AC voltage, the polarity reversal frequency optionally being 50 Hz to 1 mHz in the case of an AC voltage.

11. Process according to claim 1, wherein the monomers are present as neutral monomers, as cationic monomers and/or as anionic monomers.

12. Process according to claim 1, wherein the spacing between the cathode and the anode is 0.2 to 30 mm.

13. Process according to claim 1, wherein the free radical polymerization is carried out in a batchwise mode of operation in the electrolysis apparatus.

14. Process according to claim 13, wherein the anode and/or the cathode are configured as stirring element segments of a stirring apparatus, with which the electrolysis apparatus is equipped.

15. Process according to claim 1, wherein the free radical polymerization is carried out in a continuous mode of operation.

16. Process according to claim 15, wherein a plurality of electrolysis apparatuses having in each case a cathode and anode are connected in series and the electrolysis liquid is passed from one electrolysis apparatus into the next.

* * * * *